Patented July 10, 1945

2,379,976

UNITED STATES PATENT OFFICE 2,379,976

CONDUCTIVE PLASTIC

Bruce H. Maddock, Fanwood, N. J., assignor to Carbide and Carbon Chemicals Corporation, a corporation of New York No Drawing. Application June 9, 1943,
Serial No. 490,222

4 Claims. (Cl. 260—41)

This invention pertains to electrically conductive plastic compositions containing vinyl chloride resins in conjunction with a plasticizer.

Electrically conductive rubber compositions are known which contain natural rubber or synthetic elastomers and are highly loaded with carbon black pigments. However, even with pigments of very fine particle size, it is difficult to prepare highly conductive compositions which are also elastic since the hardness of the composition increases, and its elasticity decreases, as the amount of carbon black is increased. For instance, rubber compositions which contain sufficient carbon black to have resistivities of 1 to 10 ohm-centimeters are very hard and inelastic, but if the proportion of carbon black is reduced to give workable stocks having a Shore durometer hardness of 70 to 75, the resistivity rises so high (100 to 1000 ohm-centimeters) as to disqualify the compositions for many purposes.

According to this invention, electrically conductive compositions of high tensile strength and considerable elongation, and which are flexible, elastic and resilient, are prepared by combining carbon black in finely-divided form with a highly plasticized vinyl chloride resin. The compositions are not unduly hardened, and their tensile strengths are commercially satisfactory. It has also been established that acetylene black is more effective than other forms of carbon black in producing highly conductive plastic compositions of good physical properties. Acetylene black is a porous product of low bulk density, and it is believed to form compositions of high conductivities because the porous character of its particles permits the formation of a closely interconnected network of particles or agglomerates throughout the plastic composition. To achieve the results of this invention, the finely-divided carbon blacks must be incorporated in the plastic compositions to the extent of about 30 to 40% by weight thereof.

Plasticizing agents are required to secure adequate flexibility and elasticity in the new compositions, and the proportion required will vary from about 20% to 45% by weight of the plastic composition. Suitable plasticizers include, tricresyl phosphate, trichlorethyl phosphate, dioctyl phthalates, such as di-2-ethylhexyl phthalate, di-2-ethylhexyl endo-methylene hexahydrophthalate, dibutoxyethyl phthalate, triethylene glycol di-2-ethylhexoate and many other high-boiling liquids of a similar character.

The vinyl chloride resins employed in the composition include highly polymerized polyvinyl chloride, classified as gamma polyvinyl chloride according to its relative insolubility in organic solvents, and highly polymerized conjoint polymers of vinyl chloride with other unsaturated organic materials. A very useful resin of this latter type is a conjoint polymer of vinyl chloride with vinyl acetate having a molecular weight of 18,000 to 30,000 or higher, as determined by Staudinger's method, and a vinyl chloride content of from 85% to 95% by weight.

The compositions of this invention have a wide field of utility in reducing accumulations of static electricity. Thus, they may be used as a surface coating for films, threads, sheets and other formed objects which are poor conductors of electricity and tend to accumulate static charges. Such surface coatings may be applied by dispersing the compositions in solvents, such as mesityl oxide or isophorone, and applying the solution to the object. The composition itself may be used for hospital operating room equipment, such as mats, heels, soles, sheeting, and anesthetic tubing, where the discharge of sparks from the accumulated static charge in ordinary rubber equipment is a hazard because of possible ignition of volatile anesthetics. Similarly, inserts of the material may be used in the soles of shoes worn by workers in powder mills to help eliminate the danger of explosion caused by the sudden discharge of accumulated static electricity. Some of the compositions may themselves be used as shoe soles. The composition may also be employed as a conductive sheath for wires and cables, to replace the present metal sheaths, which are employed to ground the electrostatic field induced by the high voltage currents and to reduce corona losses. They may also be applied for shielding electrical circuits and grounding electrostatic charges induced in electrical conduit or tubing.

The compositions may be extruded in the form of tubes or solid rods, or they may be shaped in the form of tape and applied by wrapping.

The examples to follow will serve to illustrate the invention.

Example 1

The following base composition was prepared:

| | |
|---|---:|
| Conjoint polymer of vinyl chloride with vinyl acetate, combined vinyl chloride content 95% by weight, average molecular weight about 22,000 | 48.0 |
| Tricresyl phosphate | 20.0 |
| Di-2-ethylhexyl phthalate | 26.0 |
| Basic lead carbonate | 3.0 |
| Fused lead stearate | 1.0 |
| Light mineral oil lubricant | 2.0 |
| | 100.0 |

This base composition was combined by a milling operation with various finely-divided carbon blacks in proportions to give respectively, 20, 30 and 40% by weight of black in the final compositions. A mixture of the same plastic with powdered graphite was also prepared for comparison. The electrical conductivity, tensile strength, and elongation of these compositions is given below. All test values were determined on press-polished specimens.

| Filler, percent | D. C. resistivity at 25° C.—ohm-cm. | | |
|---|---|---|---|
| | Acetylene black | "Excello" 2X carbon black | Graphite |
| 20 | 9,420 | 6,800 | 5×10$^{11}$ |
| 30 | 142 | 146 | 1×10$^{10}$ |
| 40 | 26 | 36 | 10,000 |

| Filler, percent | Tensile strength (lbs. per sq. in.) | | |
|---|---|---|---|
| | Acetylene black | "Excello" 2X carbon black | #9810 graphite |
| 20 | 1,500 | 2,180 | 1,620 |
| 30 | 1,440 | 2,110 | 1,366 |
| 40 | 1,920 | 2,000 | 1,230 |

| Filler, percent | Elongation at break, percent | | |
|---|---|---|---|
| | Acetylene black | "Excello" 2X carbon black | #9810 graphite |
| 20 | 200 | 287 | 400 |
| 30 | 190 | 165 | 335 |
| 40 | 60 | 87 | 80 |

The above examples show that finely-divided carbon blacks may be incorporated in the plastic compositions in sufficient amounts to secure conductive compositions without undue sacrifice in the physical properties of the composition, although 40% of the carbon black appears to be the maximum which is tolerable without rendering the composition inelastic.

*Example 2*

The following base composition was prepared:

| | |
|---|---|
| Polyvinyl chloride | 48.0 |
| Tricresyl phosphate | 20.0 |
| Di-2-ethylhexyl phthalate | 26.0 |
| Basic lead carbonate | 3.0 |
| Fused lead stearate | 1.0 |
| Light mineral oil lubricant | 2.0 |

This base composition was combined by a milling operation with several finely-divided carbon blacks in proportions to give, respectively, 20, 30 and 40% by weight of black in the final compositions. A mixture of the same plastic with finely powdered graphite was also prepared for comparison. The electrical conductivity, tensile strength and elongation of the composition is given below. All test values were determined on press-polished specimens.

| Filler, percent | D. C. resistivity at 25° C.—ohm-cm. | | |
|---|---|---|---|
| | Acetylene black | "Excello" 2X carbon black | Graphite |
| 20 | 59,146 | 4,400 | 2.5×10$^{11}$ |
| 30 | 97 | 412 | 2.6×10$^{8}$ |
| 40 | 11 | 22 | 2.8×10$^{5}$ |

| Filler, percent | Tensile strength, lbs. per sq. in. | | |
|---|---|---|---|
| | Acetylene black | "Excello" 2X carbon black | Graphite |
| 20 | 1,622 | 2,190 | 1,068 |
| 30 | 1,963 | 2,053 | 1,403 |
| 40 | 1,923 | 2,425 | 1,195 |

| Filler, percent | Elongation at break, percent | | |
|---|---|---|---|
| | Acetylene black | "Excello" 2X carbon black | Graphite |
| 20 | 222 | 315 | 255 |
| 30 | 115 | 228 | 313 |
| 40 | 95 | 113 | 70 |

In this example, the superiority of acetylene black over other forms of finely-divided carbon in increasing the conductivity of plastic compositions is evident.

*Example 3*

With harder forms of carbon black, such as the channel blacks, the conductivity of the plastic compositions may be increased by employing more finely-divided carbon black. This is illustrated in the following table where the conductivities are given of plastic compositions containing 70% of the base composition of Example 1 and 30% of carbon black of decreasing particle size, as inversely measured in terms of surface area by the low temperature nitrogen absorption technique.

| Surface area of carbon black (square meters per gram) | D. C. resistivity at 25° C.—ohm-cm. |
|---|---|
| 210 | 1,055 |
| 220 | 500 |
| 300 | 175 |
| 330 | 50 |

Modifications of the invention other than as disclosed in the above examples will be apparent to those skilled in the art, and are included within the scope of the invention.

I claim:

1. A tough, resilient and elastic composition having a D. C. resistivity at 25° C. less than 500 ohm-cm. and capable of grounding an electrostatic charge, comprising a highly polymerized vinyl chloride resin in intimate combination with a plasticizer amounting to from about 20% to 45% by weight of the composition, and from about 30% to 40% by weight of the composition of a finely-divided carbon black.

2. A tough, resilient and elastic composition having a D. C. resistivity at 25° C. less than 142 ohm-cm. and capable of grounding an electrostatic charge, comprising a highly polymerized vinyl chloride resin in intimate combination with a plasticizer amounting to from about 20% to 45% by weight of the composition, and from about 30% to 40% by weight of the composition of acetylene black.

3. A tough, resilient and elastic composition having a D. C. resistivity at 25° C. less than 500 ohm-cm. and capable of grounding an electrostatic charge comprising a conjoint polymer of vinyl chloride with vinyl acetate, having a combined vinyl chloride content of about 85% to 95% by weight of the polymer and an average molecular weight about 18,000, in intimate combination with a plasticizer amounting to from about 20% to 45% by weight of the composition, and from about 30% to 40% by weight of the composition of a finely-divided carbon black.

4. A tough, resilient and elastic composition having a D. C. resistivity at 25° C. less than 500 ohm-cm. and capable of grounding an electrostatic charge comprising highly polymerized polyvinyl chloride in intimate combination with a plasticizer amounting to from about 20% to 45% by weight of the composition, and from about 30% to 40% by weight of the composition of a finely-divided carbon black.

BRUCE H. MADDOCK.

CERTIFICATE OF CORRECTION.

Patent No. 2,379,976. July 10, 1945.

BRUCE H. MADDOCK.

It is hereby certified that error appears in the printed specification of the above numbered patent requiring correction as follows: Page 3, first column, line 1, claim 3, for the word "about" read --above--; and that the said Letters Patent should be read with this correction therein that the same may conform to the record of the case in the Patent Office.

Signed and sealed this 16th day of October, A. D. 1945.

Leslie Frazer (Seal) First Assistant Commissioner of Patents.